(12) United States Patent
Mankosa et al.

(10) Patent No.: US 6,920,982 B2
(45) Date of Patent: Jul. 26, 2005

(54) PLASTIC MATERIAL HAVING ENHANCED MAGNETIC SUSCEPTIBILITY, METHOD OF MAKING AND METHOD OF SEPARATING

(75) Inventors: Michael J. Mankosa, Erie, PA (US); Gerald H. Luttrell, Blacksburg, VA (US)

(73) Assignee: Eriez Magnetics, Erie, PA (US)

( * ) Notice: Subject to any disclaimer, the term of this patent is extended or adjusted under 35 U.S.C. 154(b) by 533 days.

(21) Appl. No.: 10/213,472

(22) Filed: Aug. 6, 2002

(65) Prior Publication Data
US 2004/0035756 A1 Feb. 26, 2004

(51) Int. Cl.⁷ .............................................. B03C 1/01
(52) U.S. Cl. ................................................... 209/8
(58) Field of Search ........................... 209/8, 12.2, 38, 209/39, 40, 212, 213, 214, 215, 216, 225, 636; 75/10.67; 425/DIG. 46; 521/40, 40.5; 252/62.51 R; 264/405, 427, 429, 430, 911, 915

(56) References Cited

U.S. PATENT DOCUMENTS 5,335,786 A * 8/1994 Roberto ........................ 209/3
6,290,868 B1 * 9/2001 Martin et al. ............ 252/62.54
6,467,628 B1 * 10/2002 Maehata et al. ........... 209/12.2
6,864,294 B2 * 3/2005 Koike et al. ................. 521/40

FOREIGN PATENT DOCUMENTS

EP 0.295.779 A2 * 12/1988 ............. H01F/1/04

* cited by examiner

Primary Examiner—Donald P. Walsh
Assistant Examiner—Mark J. Beauchaine
(74) Attorney, Agent, or Firm—Richard K. Thomson

(57) ABSTRACT

The magnetic susceptibility of one or more plastic articles is enhanced to enable their separation from a waste stream using magnetic separators. An amount of paramagnetic material is added to the plastic formulation to influence magnetic susceptibility without affecting the properties associated with the function of the plastic article. The material is preferably selected from a group consisting of magnetite, ferro-silicon and ferromagnetic particles (e.g., iron filings). The amount or material can be varied in the range of between 0.05% and 5% by weight of the plastic formulation. The plastic with altered magnetic susceptibility and a method separating that plastic from a waste stream are also disclosed.

20 Claims, 3 Drawing Sheets

PLASTIC MATERIAL HAVING ENHANCED MAGNETIC SUSCEPTIBILITY, METHOD OF MAKING AND METHOD OF SEPARATING

BACKGROUND AND SUMMARY OF THE INVENTION

The present invention is directed to a) a method of enhancing the magnetic susceptibility of plastic material to enable it to be recycled, b) the plastic with enhanced susceptibility and c) a method of separating the susceptible plastic from a waste stream.

Plastics have found wide acceptance in industry and are used to make many articles that have a variety of applications. Hundreds of types of plastics are routinely used for commercial and consumer products such as containers for household cleaners and detergents, industrial chemicals, automobile components, children's toys and various other consumer goods. With the exception of a small percentage of household consumer products, a great majority of plastic polymers are simply discarded due to a lack of acceptable recycling techniques. Unfortunately, disposal of these plastics contributes to a continuous accumulation of consumer refuse and represents a vast waste of natural resources. The growing stacks of plastic articles at waste disposal facilities are monuments being built to our failure to effectively recycle these plastics.

Considerable research has been conducted over the past several decades with regard to material recycling. Industrial materials such as rubber tires, chopped wire and cable, and various metals from automobile shredding are currently reclaimed with commercial success using different physical processing techniques. For example, rubber tires are currently shredded/granulated to liberate nylon cord and metal belting. The nylon and metal are subsequently removed using a combination of screening, air classification and magnetic separation. The final granulated rubber product has sufficient purity to be recycled into various components such as paving materials and play area ground coverings.

Wire and cable are also extensively recycled with the intent to recover both the copper and/or aluminum wire and the plastic insulation. A typical communications cable consists of approximately 80–85% copper and various types of plastics. The cable is typically sheared into smaller pieces suitable for shredding/granulation. The granulated product (particle size of approximately 6 mm and smaller) is air-classified to remove dust/fluff and separated into metallic (copper/aluminum) and non-metallic (plastic) components using gravity and electrostatic-based separation procedures. This approach produces a high-quality metal product that can be sold directly as a commodity.

Unfortunately, the plastic by-product from this approach is often not of an acceptable quality for re-use since it consists of a mixture of components such as PVC, PET, rubber and other plastics. Each plastic component must be refined to an acceptable quality to be considered for recycling by mixing with virgin components. Further refining of the different plastic components, however, has proven a difficult task.

Various attempts have been made to recycle mixed plastic components. These have included gravity and electrostatic separation. Gravity-based processes rely upon the density difference between plastic components. For instance, process specifications may require separation of two components having a density difference of less than 0.05 specific gravity units. Separation of components with nearly the same density requires an extremely precise process that, while possible, is not practical in a continuous commercial process. Furthermore, control of media density at such a low value requires the use of dissolved salts. This presents two additional problems: high corrosion of process equipment and the need to rinse and dry the final products (which adds cost).

Another attempt to separate plastics employs electrostatic techniques. Triboelectrostatic separation depends upon the electrical properties of the plastic surface. Specifically, the work function of one plastic must differ substantially from the second plastic component so as to acquire an opposite electrical charge. Unfortunately, this approach suffers from an extremely low throughput capacity and an inability to produce a high purity product. Additionally, since the separation mechanism is surface dependent, coatings, contaminants and changes in atmospheric conditions (i.e., temperature and humidity) can affect the quality of the separation. Gravity- and electrostatic-based processes have had limited success since these techniques cannot achieve the desired product purity at an acceptable product recovery rate.

Limited success has also been achieved in recycling of post consumer waste. In this instance, plastics are hand sorted from other refuse by consumers and disposed of using curbside collection facilities. Separation of the various types of plastics (i.e., PVC, PET, etc.) Is accomplished by hand sorting at material recycling facilities. In some instances, whole bottle sorting machines have been employed in place of hand sorting.

It is apparent that the current methods for recycling plastic are woefully inadequate to accomplish efficient separation of high purity plastics of the type needed for most recycling applications. Accordingly, it is the intention of the present invention to suggest a different approach that is capable of providing a high-purity recycled plastic product at acceptable processing rates.

In order to produce an effective separation process, it was necessary to re-engineer the plastic to be separated. That is, it is a distinctive feature of the present invention to manipulate the magnetic susceptibility of plastic polymers used to formulate products through the use of additives. It is well known that magnetic separation is an efficient, high capacity process that is well suited for separation of granular-size material. The concept of magnetic separation is based on the ability to attract a particular material exhibiting a magnetic susceptibility and then physically segregate it from particles that are non-magnetic or that have a different susceptibility. Magnetic susceptibility is an inherent property of a material and, as such, is the single most important parameter when addressing the characteristics of magnetic separation. Unfortunately, plastic polymers do not exhibit a natural magnetic susceptibility of sufficient magnitude to permit separation.

In the present invention, the magnetic susceptibility of a plastic polymer is altered by the inclusion of a ferromagnetic material, selected from the group consisting of magnetite ($Fe_3O_4$), ferro-silicon, and ferrous metal particles (e.g., iron filings), in the formulation prior to the product's formation (although it will be appreciated other ferromagnetic materials could be used to alter the material's magnetic susceptibility).

The present invention comprises a method of enhancing the magnetic susceptibility of a plastic article to facilitate its removal from other material for recycling, by blending a given amount of a magnetic material into a plastic formulation prior to formation of said article, the given amount being small enough so as not to materially affect properties associated with its function while being large enough to alter the magnetic susceptibility of the article. The magnetic material is preferably selected from a group consisting of magnetite and ferrous metal particles which is/are added in a range between 0.01% and 5% by weight.

Another facet of the present invention is a plastic material with enhanced magnetic susceptibility facilitating its removal from other material to permit its recycling, the plastic material comprising a plastic polymer into which is blended a given amount of a magnetic material prior to formation of an article, the given amount being small enough so as not to materially affect properties associated with the function of the article while being large enough to alter said magnetic susceptibility of the article.

The invention further includes a process for separating at least one plastic polymer having enhanced magnetic susceptibility from a stream of articles, the stream including plastic articles, the method comprising at least two of the steps of a) reducing a size of the plastic articles into a range of sizes of plastic particles; b) classifying the range of sizes of plastic particles; c) preparing the classified plastic particles; d) removing tramp metal from the prepared plastic particles; and e) subjecting the prepared plastic particles to at least a first magnetic field to remove the plastic polymer having enhanced magnetic susceptibility from the prepared plastic particles. Preferably, the process of claim 7 wherein said at least two steps include steps a) and e).

The separating process preferably comprises subjecting the prepared plastic particles to at least one additional magnetic field having a different strength than the first magnetic field to remove at least one additional polymer with a different level of enhanced magnetic susceptibility than the first plastic polymer. The reducing step comprises performing a function selected from the group consisting of crushing, shredding, grinding and granulating and the classifying step comprises performing at least one of the functions selected from the group consisting of de-dusting and screening. The preparing step comprises performing at least one operation selected from the group consisting of drying and cleansing a surface of the classified particles. The invention may include performing a step of secondary separation of the removed plastic polymer.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

In order to appreciate the nuances of the invention, a basic understanding of the fundamentals of material properties is needed. Particles may be classified into one of four groups based upon the manner in which such particles respond to a magnetic field: ferromagnetic, paramagnetic, diamagnetic, and non-magnetic. Ferromagnetic materials are those that have a very high susceptibility to a magnetic field and are strongly influenced thereby. Paramagnetic materials are those that have a low magnetic susceptibility and are weakly influenced by a magnetic field. Diamagnetic materials have a negligible magnetic susceptibility and, for all practical purposes, may be considered non-magnetic. Non-magnetic materials have no susceptibility to magnetic fields.

Ferromagnetic materials and to a lesser extent, paramagnetic materials, become magnetized when placed in a magnetic field. The amount of magnetization induced on the particle depends on the mass, the magnetic susceptibility of the particle, and the intensity of the magnetic field that is applied. The induced magnetization, M, of a particle can be expressed as follows:

$$M = mXH \tag{1}$$

where m is the mass of the particle, X is the specific magnetic susceptibility of the particle (a constant for any particular material), and H is the magnetic field intensity.

By definition, a separation process relies upon the ability to make one type of particle move relative to another by applying an external force. In this instance, a magnetic force is applied that is sufficient to move particles of high magnetic susceptibility relative to all other material. Likewise, particles exhibiting a low magnetic susceptibility (i.e., paramagnetic materials) can be moved relative to non-magnetic and diamagnetic particles. It is obvious, therefore, that the force acting on the particle must quantified and controlled.

Figure 1A:
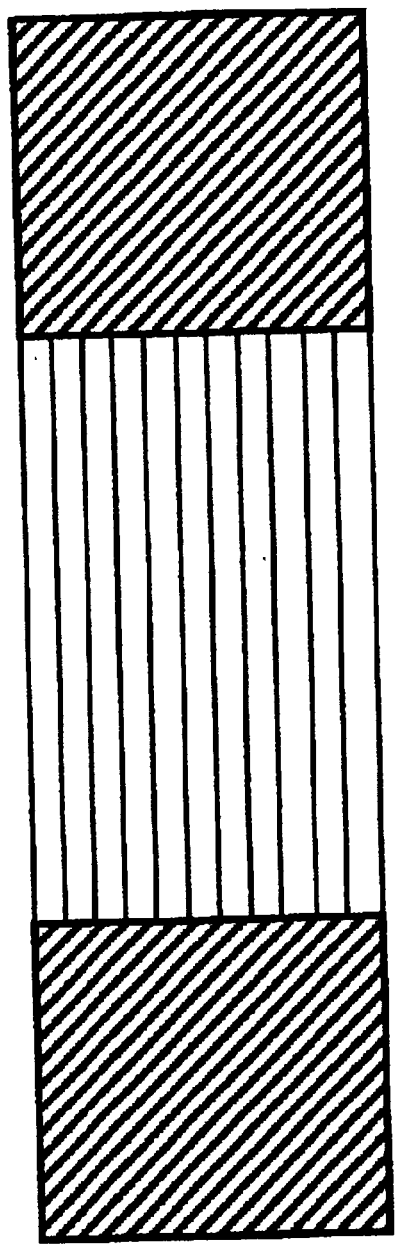
FIG. 1A is a graphic depiction of a uniform magnetic field, i.e., dH/dx=0.
Figure 1B:
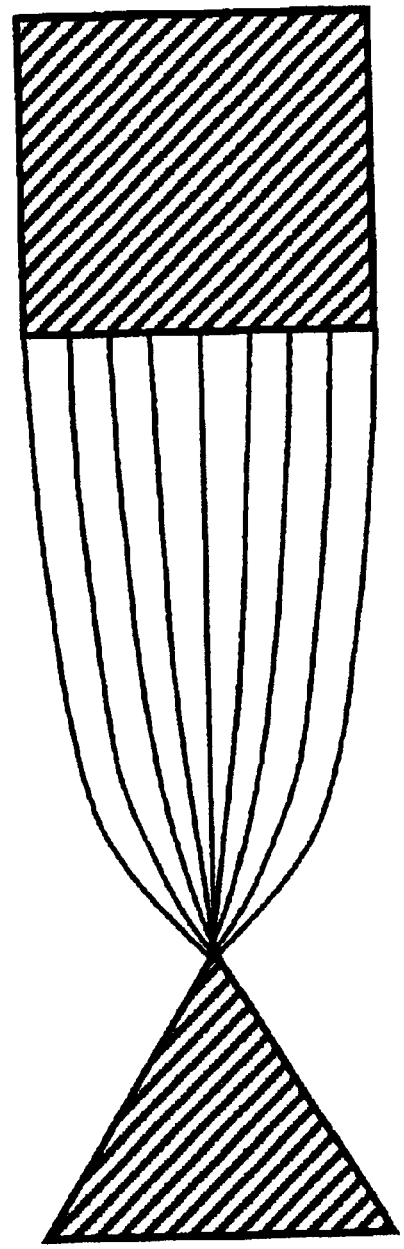
FIG. 1B is a graphic representation of a converging magnetic field, i.e., dH/dx>0.

The magnetic force acting on the particle depends upon the induced magnetization, M, as well as the field gradient. The magnetic field gradient refers to the rate of change or the convergence of the magnetic field strength. This concept is illustrated in FIGS. 1A and 1B. FIG. 1A has a uniform pattern of flux lines without gradation, that is there is no change of magnetic field strength over distance (dH/dx=0). A magnetic particle entering this field will be attracted to the lies of flux and remain stationary without migrating to either pole piece. FIG. 1B illustrates a converging pattern of flux lines displaying a high gradient (dH/dx>0). As these lines pass through a smaller area, there is a significant increase in the magnetic field intensity. A magnetic particle entering this field configuration will not only be attracted to the lines of flux but will also migrate to the region of highest flux density, which occurs at the tip of the bottom pole piece. This illustrates the methodology for magnetic separation. In simplified terms, the magnetic field intensity holds the particle while the magnetic field gradient moves the particle.

From equation (1), the magnetic attractive force acting on a particle is the product of the particle magnetization and the magnetic field gradient and can be expressed as:

$$F_m = mxH\frac{dH}{dx} \text{ or } M\frac{dH}{dx} \tag{2}$$

where dH/dx is the magnetic field gradient.

Figure 2:
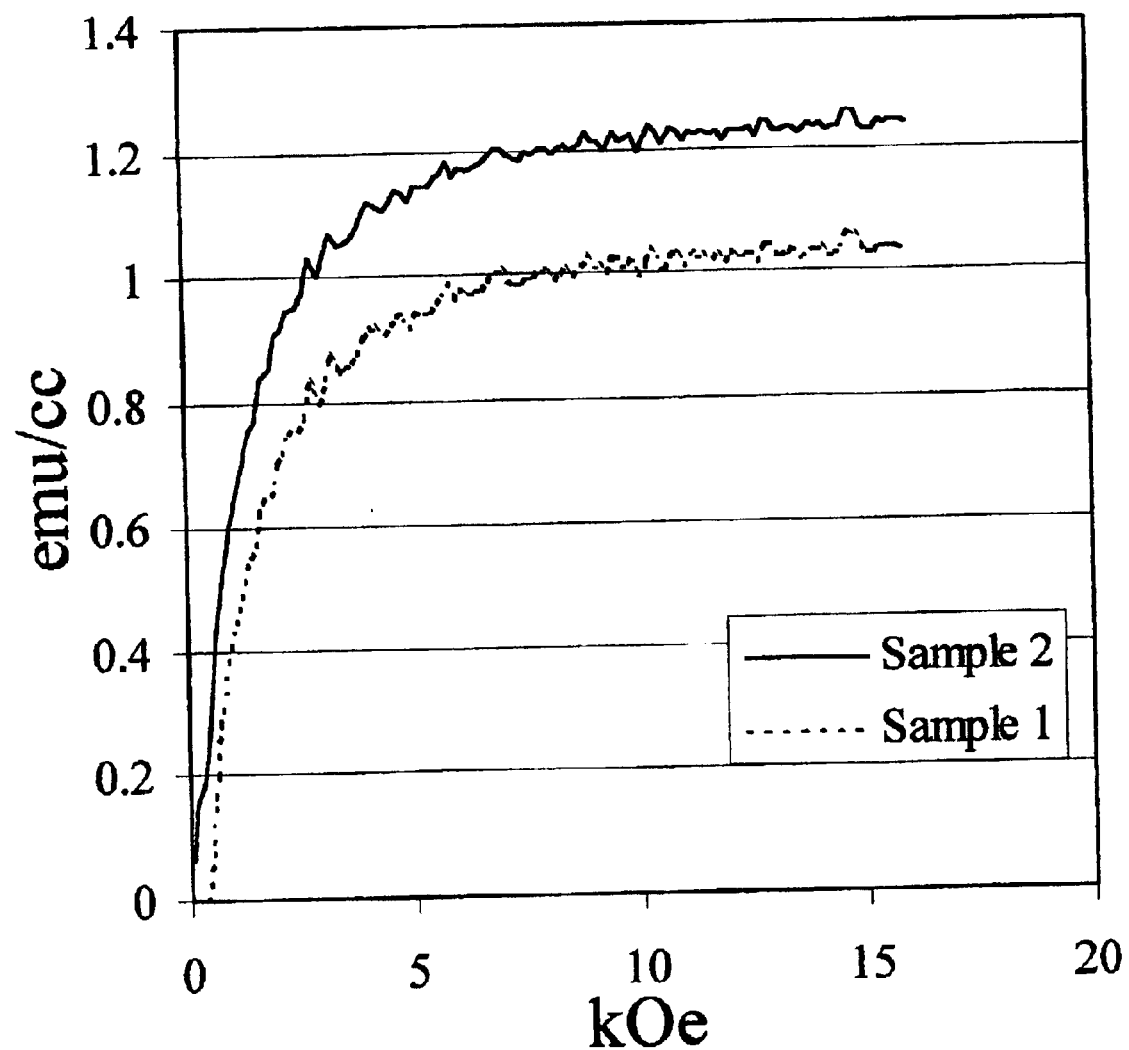
FIG. 2 is a graphic depiction of magnetization M as a function of field strength.

It can be seen from equation (2) that for a fixed magnetic field strength and gradient, relative particle motion can only be achieved through a difference in magnetic susceptibility. To achieve separation of a mixture of polymers requires that the susceptibility of one type of plastic be substantially different from another. Magnetic susceptibility (X) is a fundamental bulk property of a material and is quantified using a vibrating magnetometer. The response curve, shown in FIG. 2, provides the magnetization M (emu/cc) as a function of the applied magnetic field that is measured in kilo-Oerstads (kOe). The magnetic susceptibility is determined from the initial slope of the response curve and is reported as emu/cckOe. Using this procedure, the response curves for plastics containing different amounts and/or types of additives can be determined. Furthermore, as shown in FIG. 2, it is clear that the magnitude of the susceptibility can be adjusted by varying the amount of additive. As discussed above, given an appropriate magnetic field gradient, it is obvious that a separation can then be achieved based on the difference in magnetic susceptibilities.

The susceptibility can be altered through the addition of magnetic materials at various points in the manufacture of the polymer or the end product. The plastic material of the present invention has its magnetic susceptibility altered by the inclusion of an amount of a ferromagnetic material such as a material selected from the group of magnetite, ferro-silicon and ferrous metal particles (e.g., iron filings). The ferromagnetic material will be added in an amount sufficient to alter the magnetic susceptibility of the resultant plastic part without materially altering the properties that affect the function of that part. The amount of the magnetic material added preferably falls in the range of between 0.01% and 5% by weight of the plastic polymer/article.

Figure 3:
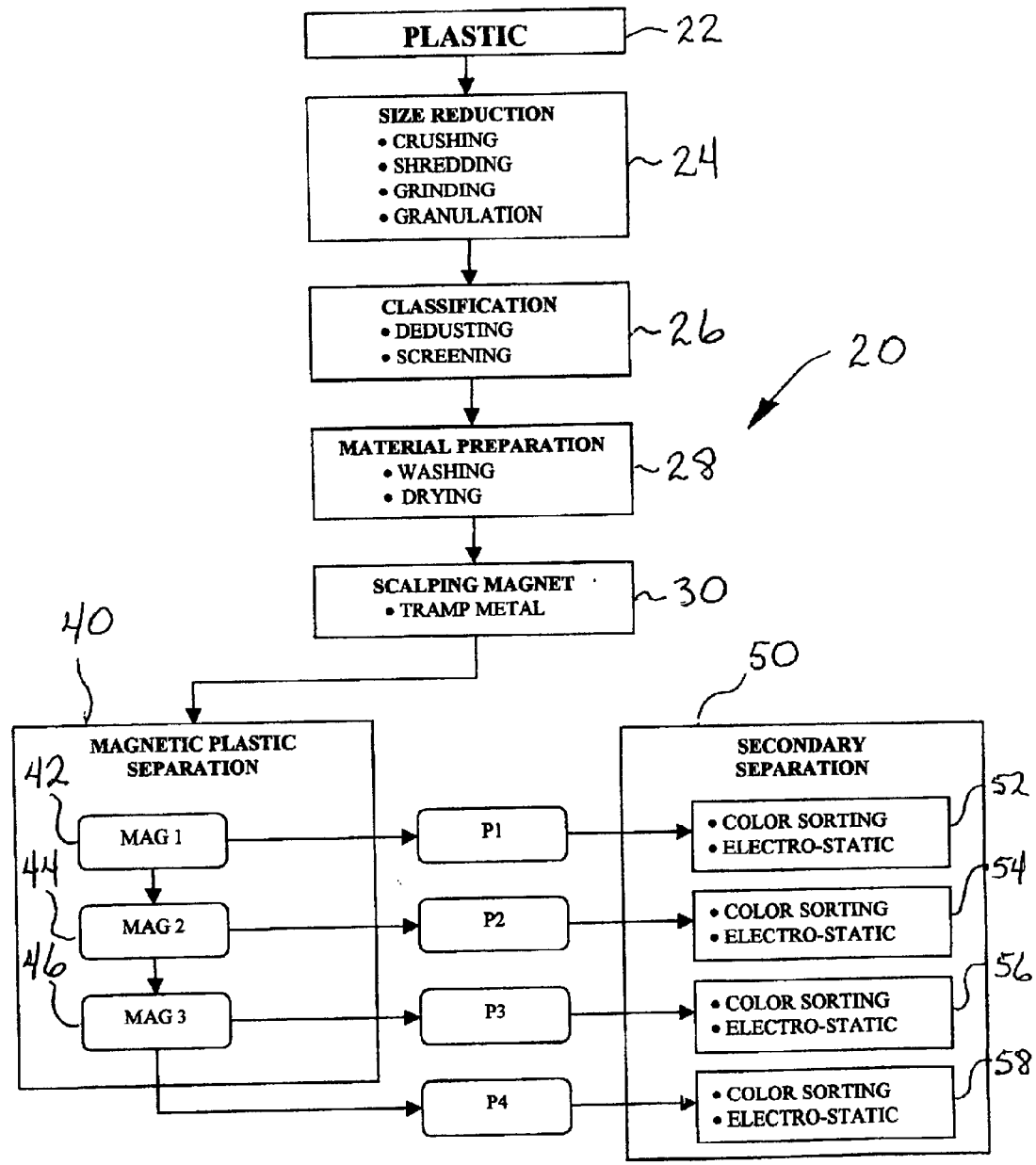
FIG. 3 is a flow chart depicting the steps of the method of separation of a first embodiment of the present invention.

FIG. 3 depicts a flow chart of the method of separating plastic material with altered magnetic susceptibility generally at 20. In box 22, plastic scrap is processed through size reduction step 24. The size reduction is selected from the group of crushing, shredding, grinding and granulating the plastic scrap. From there, the particles of plastic scrap may be classified using one or more of the steps of dedusting and screening as shown in step 26. The classified plastic particles may then undergo the step of material preparation as shown in step 28 which includes one or more of the steps of washing and drying the particles. The prepared particles are then, in step 30, subjected to a scalping magnet that removes any tramp metal which may have been incorporated into the stream of plastic particles.

The prepared particles from which metal has been removed are then fed to a series of one or more magnetic separators that have magnets of increasing magnetic strength as shown in step 40. The magnet 42 will remove the plastic particles $P_1$ with the greatest magnetic susceptibility. This may, for example, be done by the use of a magnetic roller used as the end support roller in a conveyor belt. The magnetic roller will keep the particles $P_1$ with the desired magnetic susceptibility in contact with the conveyor belt dropping them into a bin or other receptacle or depositing them on a second conveyor belt. The balance of the stream will be transferred to a second conveyor belt where the particles will be subjected to a second magnetic roller 44 with stronger magnetic field removing a second group of plastic particles $P_2$ with lower magnetic susceptibility from the stream, a third roller 46 removing a third plastic, and so on, for as many plastic materials as are desired to be separated. The plastic particles $P_1$–$P_4$ which have been grouped by magnetic susceptibility may then undergo secondary separation processes as shown in step 50 at 52, 54, 56, and 58.

Various changes, alternatives and modifications will become apparent to one of ordinary skill in the art following a reading of the foregoing specification. It is intended that any such changes, alternatives and modifications as fall within the scope of the appended claims be considered part of the present invention.

We claim:

1. A method of enhancing the magnetic susceptibility of a plastic article to facilitate its removal from other material, the method comprising blending a given amount of a magnetic material into a plastic formulation prior to formation of said article, said given amount being small enough so as not to materially affect properties associated with its function while being large enough to alter said magnetic susceptibility of the article.

2. The method of claim 1 wherein said magnetic material is selected from a group consisting of magnetite, ferro-silicon and ferrous metal particles.

3. The method of claim 1 wherein said blending step comprises adding an amount of said selected material in the range between 0.01% and 5% by weight.

4. A plastic material with enhanced magnetic susceptibility facilitating its removal from other material to permit its recycling, said plastic material comprising a plastic polymer into which is blended a given amount of a magnetic material prior to formation of an article, said given amount being small enough so as not to materially affect properties associated with the function of the article while being large enough to alter said magnetic susceptibility of the article.

5. The plastic material of claim 4 wherein said magnetic material is selected from a group consisting of magnetite, ferro-silicon and ferrous metal particles.

6. The plastic material of claim 4 wherein said given amount comprises an amount in the range between 0.01% and 5% by weight.

7. A process for separating at least one plastic polymer of claim 4 having enhanced magnetic susceptibility from a stream of articles, said stream including plastic articles, said method comprising at least two of the steps of
   a. reducing a size of the plastic articles into a range of sizes of plastic particles;
   b. classifying said range of sizes of plastic particles;
   c. preparing the classified plastic particles;
   d. removing tramp metal from the prepared plastic particles;
   e. subjecting the prepared plastic particles to at least a first magnetic field to remove said plastic polymer having enhanced magnetic susceptibility from said prepared plastic particles.

8. The process of claim 7 wherein said at least two steps include steps a. and e.

9. The separating process of claim 7 further comprising subjecting the prepared plastic particles to at least one additional magnetic field having a different strength than said first magnetic field to remove at least one additional polymer with a different level of enhanced magnetic susceptibility than the first plastic polymer.

10. The separating process of claim 7 wherein said reducing step comprises performing a function selected from the group consisting of crushing, shredding, grinding and granulating.

11. The separating process of claim 7 wherein the classifying step comprises performing at least one of the functions selected from the group consisting of de-dusting and screening.

12. The separation process of claim 7 the preparing step comprises performing at least one operation selected from the group consisting of drying and cleansing a surface of the classified particles.

13. The separation process of claim 7 further comprising the step of performing secondary separation of the removed plastic polymer.

14. A process for separating at least one plastic polymer which has enhanced magnetic susceptibility from a stream of articles, said stream including plastic articles, said method comprising at least two of the steps of
  a. reducing a size of the plastic articles into a range of sizes of plastic particles;
  b. classifying said range of sizes of plastic particles;
  c. preparing the classified plastic particles;
  d. removing tramp metal from the prepared plastic particles;
  e. subjecting the prepared plastic particles to at least a first magnetic field to remove said plastic polymer having enhanced magnetic susceptibility from said prepared plastic particles.

15. The process of claim 14 wherein said at least two steps include steps a. and e.

16. The separating process of claim 14 further comprising subjecting the prepared plastic particles to at least one additional magnetic field having a different strength than said first magnetic field to remove at least one additional polymer with a different level of enhanced magnetic susceptibility than the first plastic polymer.

17. The separating process of claim 14 wherein said reducing step comprises performing a function selected from the group consisting of crushing, shredding, grinding and granulating.

18. The separating process of claim 14 wherein the classifying step comprises performing at least one of the functions selected from the group consisting of de-dusting and screening.

19. The separation process of claim 14 the preparing step comprises performing at least one operation selected from the group consisting of drying and cleansing a surface of the classified particles.

20. The separation process of claim 14 further comprising the step of performing secondary separation of the removed plastic polymer.

* * * * *